United States Patent
Harris, Sr.

(10) Patent No.: US 10,314,247 B2
(45) Date of Patent: Jun. 11, 2019

(54) BOTTOMLESS IN-GROUND GARDEN-PLANT WATERING-WELL WITH REMOVABLE TWIST-RING

(71) Applicant: Donald Eugene Harris, Sr., Cedar Park, TX (US)

(72) Inventor: Donald Eugene Harris, Sr., Cedar Park, TX (US)

(*) Notice: Subject to any disclaimer, the term of this patent is extended or adjusted under 35 U.S.C. 154(b) by 114 days.

(21) Appl. No.: 14/949,871

(22) Filed: Nov. 23, 2015

(65) Prior Publication Data
US 2017/0086387 A1   Mar. 30, 2017

Related U.S. Application Data

(63) Continuation-in-part of application No. 14/866,845, filed on Sep. 26, 2015, now Pat. No. 10,123,490.

(51) Int. Cl.
| | |
|---|---|
| *A01G 13/04* | (2006.01) |
| *A01G 9/029* | (2018.01) |
| *A01G 13/02* | (2006.01) |
| *A01G 9/12* | (2006.01) |

(52) U.S. Cl.
CPC ....... *A01G 9/0291* (2018.02); *A01G 13/0237* (2013.01); *A01G 9/124* (2013.01)

(58) Field of Classification Search
CPC . A01G 9/02; A01G 9/021; A01G 9/10; A01G 9/102; A01G 13/04; A01G 13/0237
USPC .......... 47/65, 65.5, 66.1, 66.7, 69, 87, 19.1, 47/19.2; D11/143, 152, 153, 154, 164
See application file for complete search history.

(56) References Cited

U.S. PATENT DOCUMENTS

| | | | | |
|---|---|---|---|---|
| 4,803,806 A  | * | 2/1989 | Ito | A01G 9/00 248/27.8 |
| 6,360,484 B1 | * | 3/2002 | Kreizel | A01G 9/02 47/30 |
| 7,886,484 B1 | * | 2/2011 | Chen | A01G 9/02 220/640 |
| 9,139,322 B2 | * | 9/2015 | Leyshon | F21V 1/06 |
| 2002/0005011 A1 | * | 1/2002 | Goldberg | A01G 9/028 47/65.5 |
| 2009/0025290 A1 | * | 1/2009 | Trabka | A01G 9/026 47/66.7 |
| 2012/0060415 A1 | * | 3/2012 | Harbaugh | A01G 9/021 47/66.1 |
| 2014/0196365 A1 | * | 7/2014 | Washington | A01G 9/124 47/66.6 |

* cited by examiner

*Primary Examiner* — William V Gilbert

(57) ABSTRACT

An in-ground plant container with watering-well that is open at both ends and is functional and decorative. The above-ground portion of this present embodiment has a circular watering-well bowl that is surrounded by a removal-able twist-ring rim that is both functional and decorative. The twist-ring along with several aspects of this embodiment work together to keep the plant container's watering-well bowl above ground-level.

The bottom, below-ground portion, has vertical fins to prevent lateral rotation of plant container from repeated twist-ring removal and re-attachment; and two attached horizontal flanges also help to prevent upward and downward movement.

The non-organic watering-well bowl replaces the organic soil-watering-well. This in-ground plant container with watering-well is for conserving water, and the containment of water contaminated by pesticides, herbicides, and fertilizers.

2 Claims, 6 Drawing Sheets

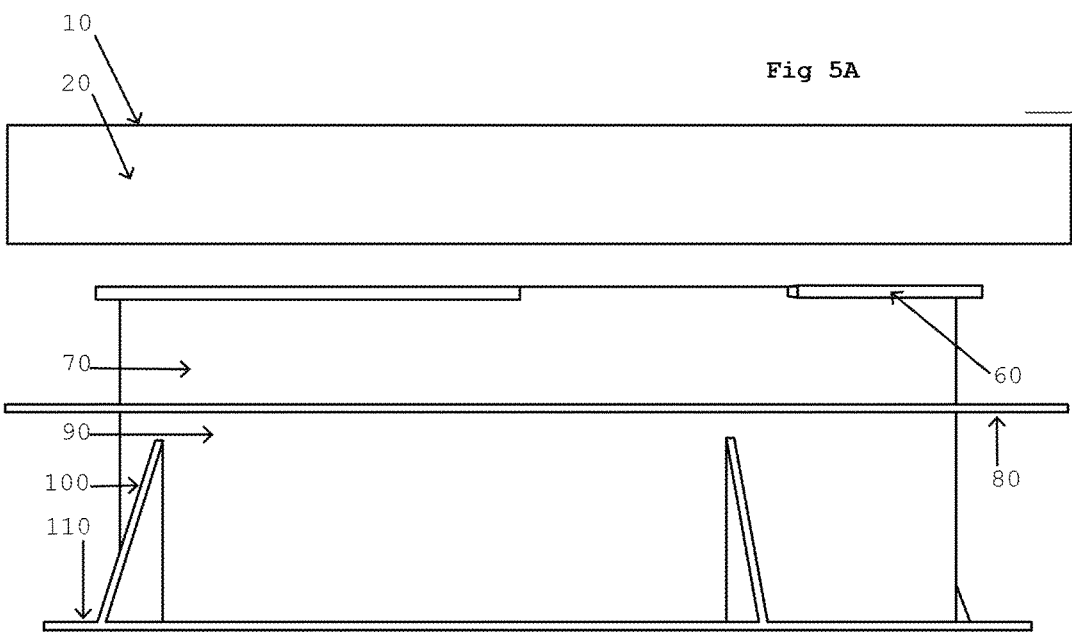
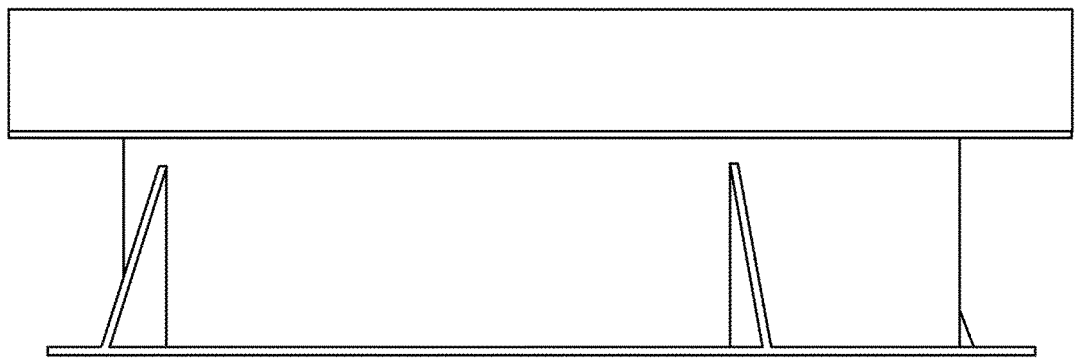

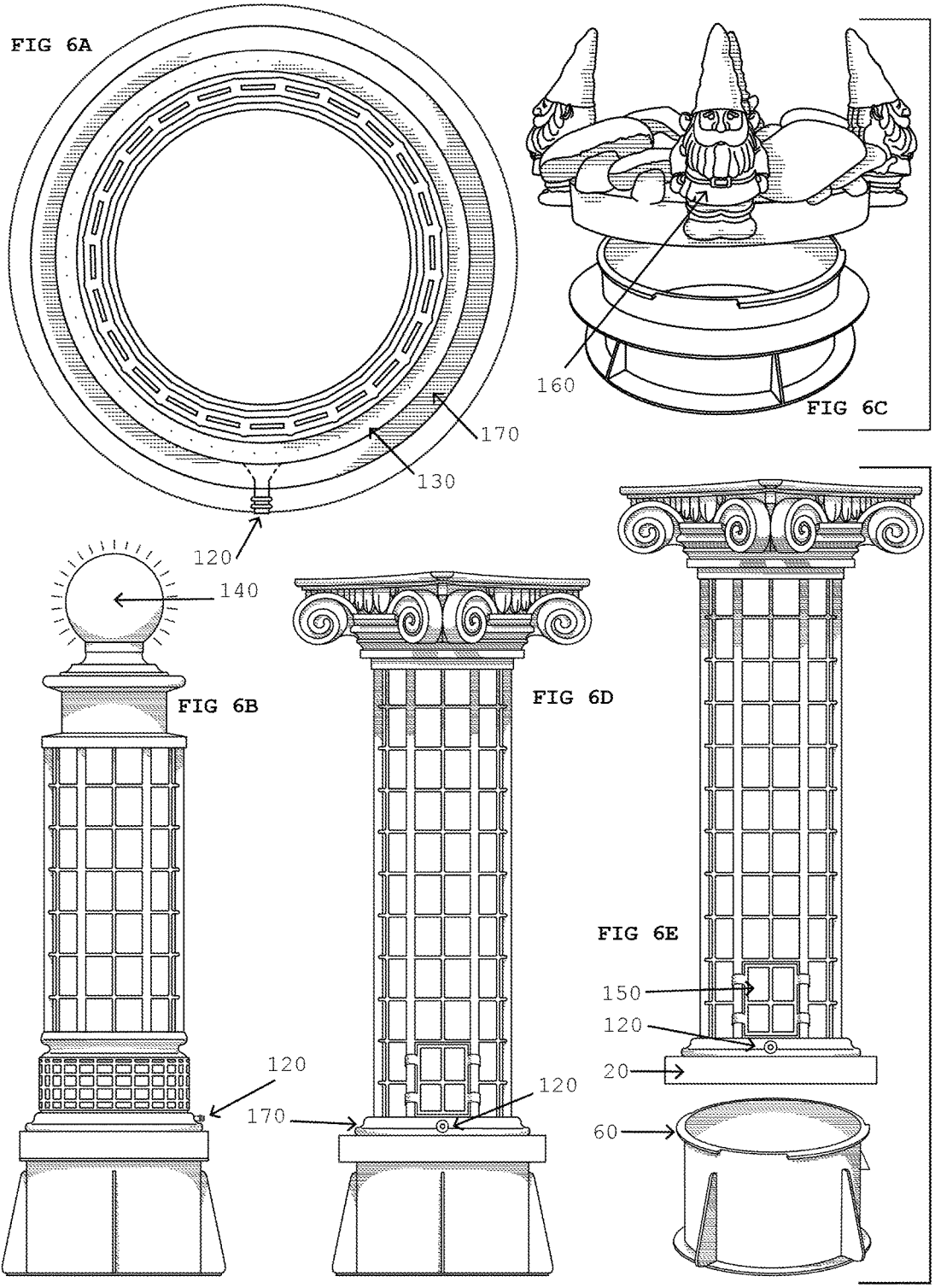

BOTTOMLESS IN-GROUND GARDEN-PLANT WATERING-WELL WITH REMOVABLE TWIST-RING

RELATED APPLICATIONS

Continuation-in-part; Application #: 23614068; Filed Sep. 26, 2015, for BOTTOMLESS IN-GROUND WATER CONSERVATION AND CONTAMINATION PREVENTION GARDEN-PLANT WATERING-WELL; by Donald E. Harris, Sr.

FIELD OF THE INVENTION

This present embodiment relates to bottomless garden plant containers and, more particularly, to a bottomless garden plant container that conserves water and limits unwanted water waste, including the limiting of pesticide, herbicide, and fertilizer contamination due to uncontrolled water runoff.

BACKGROUND

Plant and flower gardening has been around since the beginning of civilization and with it comes the continuous need for fertilizer, weed and pest prevention, and water, lots and lots of water. Water has always been a precious and, an invaluable resource, in today's world, it is even more so, and the need for conserving it is at an all-time.

Nearly every home, in nearly every place, has an area where they will have plants and flowers growing, or someone attempting to do so. According to the article, Blades of glory: America's love affair with lawns in the Jun. 24, 2011, edition of the magazine, The Week, about 80 percent of American homes have yards. And based on the 2011 American Housing Survey of the United States, there are approximately 100 million houses in America, and this means there are approximately 80 million American yards or variants of yards, that can be landscaped, and landscapes need watering.

The scope of this embodiment does not deal with watering lawns; its focus is primarily with the many flowering annuals, perennials, bulbs, small to larger shrubs, and all the varying things gardeners like to plant in the soil of all these yards aside from their lawns. That equates to lots of watering, fertilizing, herbicides, and the applying of pesticides; and herein lies the problem: lots of water, contaminated with fertilizers, herbicides, and pesticides can end up flowing away from the target plant and flowers towards areas for which they were not intended.

Every day there is someone somewhere watering a plant in their garden; and along with them are the gardening enthusiasts, who out of love for their little botanical friends, are diligently applying fertilizers, pesticides, and herbicides. One outcome that these well-meaning groups have in common is this: more-often-than-not they watch helplessly as much of the needed water, and gardening additives, flow to surrounding areas and away from the plant for which they were intended. And in today's world water has become a commodity, and its conservation is a responsibility in which each person should participate.

There have been attempts at correcting this seemingly universal problem for gardeners for many years, and a prevalent solution was to build up a bowl-shaped mound of soil around the base of the plant, commonly referred to as a soil watering-well. It was intended to contain the water long enough for it to percolate down to the plant's roots. A few of the other solutions are the use of mulches piled around the plant in the hopes of retaining moisture, or stones sunk into the soil around the plant as a border, or to simply place the plant several inches below ground level.

Unfortunately, the aforementioned so-called solutions, along with many others, generally fail soon after their implementation. A soil watering-well tends to absorb water laterally as well as gravitationally, and by the very act of watering, it erodes away. And when the soil watering-well erodes away the dry soil has less time for the water to saturate down before the water becomes wasteful runoff. And often taking with it gardening chemicals such as fertilizers, pesticides, and herbicides.

Mulch mounds are not much better at solving the issue, in fact, they can exacerbate the problem of garden chemical products like pesticides and herbicide runoff. Mulches are breeding grounds for pests like earwigs and pillbugs to name a few, which encourages greater use of pesticides, which then accumulates in the mulches; and mulches tend to float and flow with water runoff from over watering and large downpours of rain. These so-called solution failures are typical of the other solutions as well as those not mentioned. The worst consequence of these runoffs are the gardening chemicals used to help grow and protect our garden plants; they often end up flowing into street gutters, streams, ponds and other environmentally sensitive areas. Although there are various methods of trying to prevent water and chemical runoff, all, or almost all suffer from one, or more than one disadvantage.

Therefore, there is a need to provide methods and apparatus for improved, and more secure methods, for the prevention of wasteful water runoff and the containment of useful gardening products to prevent them from becoming a detriment, and danger, to their surrounding environments.

As long as there are plants and water, there will be gardening, and gardening is here stay. However, it can be accomplished more effectively and environmentally friendly.

PRIOR ART

The following is a tabulation of some prior art that presently appears relevant:

I am aware of U.S. Pat. No. US 2009/0025290 A1, Jan. 29, 2009, Bottomless Plant Container which was issued to Ball Horticultural Company for growing plants in an open-bottom plant container.

I am, also aware of prior art U.S. Pat. No.: US 2002/0005011 A1 issued to Lauri and David Goldberg Jan. 17, 2002 Bottomless Compartmentalized In-Ground Garden Container.

Shortcomings of Other Solutions

U.S. Pat. No. U.S. 2009/0025290 A1 Open-bottom plant container is a temporary biodegradable container for transporting rooted plants for placing in their final growing site.

These products are designed as only temporary containers; whereas this present embodiment of the Bottomless In-Ground Garden-Plant Watering-Well with Removable Twist-Ring is for permanent use.

Also, it is neither taught nor suggested that U.S. Pat. No. US 2009/0025290 A1 Bottomless Plant Container is designed to conserve water and limit the runoff of gardening chemicals or products.

U.S. Pat. No.: US 2002/0005011 A1: What is disclosed is a garden container that includes a rigid outer wall defining a perimeter and having opposite upper and lower edges around the perimeter. Its outer and inner circular walls and intersecting walls are designed to slice into the soil.

It is neither taught nor suggested that this bottomless container is designed to conserve water and limit the runoff of gardening chemicals or products. It also states, that: " . . . substantially the container may be manually placed or depressed into the soil until the rim of the container is generally flush with the soil surface." (Excerpt from Summary of the Invention; first paragraph, lines: 11-13).

Unfortunately, being flush with the soil allows for wasteful water runoff, chemical contamination of surrounding areas and the dispersion of other gardening products. This prior art bottomless garden container has no apparatus to limit vertical movement either upwards or downwards, which could result in all, or portions, of this prior art container sinking below ground level; and it is neither taught nor suggested that this device was designed to prevent that from happening.

Advantages of Present Embodiment

Thus several advantages of one or more aspects would be to provide a bottomless in-ground plant container that conserves water via the use of a non-eroding watering-well.

Other advantages of one or more aspects are to provide a bottomless in-ground plant container watering-well with a removal twist-ring that can be both decorative and functional.

It would further be advantageous to provide a bottomless in-ground plant container watering-well that helps protect its surrounding environments from harmful herbicides, pesticides, and fertilizer runoff.

It would also be advantageous to have a bottomless in-ground plant container watering-well that protects plants and flowers from grass trimmers above ground and help limit unwanted weeds and grass rhizomes below ground.

It would also be advantageous to have a bottomless in-ground plant container that can keep bulbs and rhizomes in one location and separate from other bulbs and rhizomes to help limit unwanted color changes.

It would further be advantages to have a bottomless in-ground plant container watering-well that encourages earthworm growth and population for plant and soil health.

It would also be advantages to have a bottomless in-ground plant container watering-well that directs water flow downwards to the plant's roots instead of flowing away from the roots and across the soil's surface.

These and other advantages of one or more aspects will become apparent from a consideration of the ensuing description and accompanying drawings.

SUMMARY OF THE INVENTION

In accordance with the present embodiment of the Bottomless In-Ground Garden-Plant Watering-Well with Removable Twist-Ring, there is provided an in-ground plant container that is open at both ends and is both functional and decorative. This embodiment consists of two separate parts: the plant container and the removable twist-ring. The plant container has both an above ground-level portion and a below-ground-level portion. The above ground-level portion is the watering-well, in this present embodiment, its lip has an appropriate height to keep its top edge above ground level, the below-ground-level portion is the well's barrel, and in this present embodiment, it has an appropriate depth for plant health. On the lip of the watering-well bowl is a flange with evenly spaced voids which allow for evenly spaced teeth within the twist-ring to match up and then to securely twist-attach the twist-ring to the watering-well portion of the plant container.

Attached to the outside of the barrel are two flanges. The first one is at ground level, and this one is the twist-ring floor. It has three purposes: 1) a floor for the twist-ring to rest on to keep pests and vegetation from getting up into its undercarriage; 2) as extra support for keeping the watering-well above ground-level; 3) and as a built-in guide for correct height placement within the soil. The second flange is attached at the barrel's base, and this flange is to limit the plant-container from upward vertical movement and is secondary support for keeping the watering-well above ground-level. Also attached to the outside of the barrel and the perpendicular flange are evenly spaced lateral fins for overall strength and support and operates in limiting of lateral circular movement, especially from the repeated removing and replacing of the twist-ring.

The twist-ring's inner circumference aligns with the inner circumference of the plant-container, and the twist-ring's outer circumference width aligns with the circumference of the twist-ring's floor. This ring is designed for ease of removal and replacement by either twisting left or right; alignment tics visually placed on the inside walls of both the twist-ring and the watering-well are for ease of ring centering; however, exact centering with the marks is not necessary for a secure attachment. The twist-ring is both functional and decorative; and is third support for limiting the watering-well from sinking to, or below, ground-level.

BRIEF DESCRIPTION OF THE DRAWINGS

A complete understanding of the present embodiment may be obtained by reference to the accompanying drawings when considered in conjunction with the subsequent, detailed description, in which:

FIGS. 5A to 5B shows side views of a watering-well with its twist-ring detached from its bowl and a watering-well with its twist-ring attached to its bowl.

FIGS. 6A to 6E shows a collective view of various aspects of In-Ground Garden-Plant Watering-Wells with Twist-Rings. These conceptual aspects are not to be considered limiting, as watering-wells with twist-rings can be configured in unlimited ways, nor do they constitute a departure from the true spirit and scope of this invention.

FIG. 6A is a bottom view of an aspect of a watering-well with a drip-tube attached to the inner wall of a column's base mounted on top of a twist-ring, and the drip-tube has a standard quick-connect valve attached to it for watering.

FIG. 6B shows a side view of an embodiment of a watering-well with a lattice-column twist-ring with a quick-connect valve, a solar-powered light attached to the column's capital, and the lattice-column twist-ring attached to its bowl.

FIG. 6C shows an embodiment of a watering-well with a gnome embellished twist-ring.

FIG. 6D shows a back view embodiment of a watering-well with lattice-column twist-ring with a Corinthian-style capital and an access panel and a quick-connect valve.

FIG. 6E shows a view of the watering-well with lattice-column twist-ring with Corinthian-style capital detached from its bowl.

FIG. 7. (canceled)

DRAWINGS—REFERENCE NUMERALS

Figure 1:
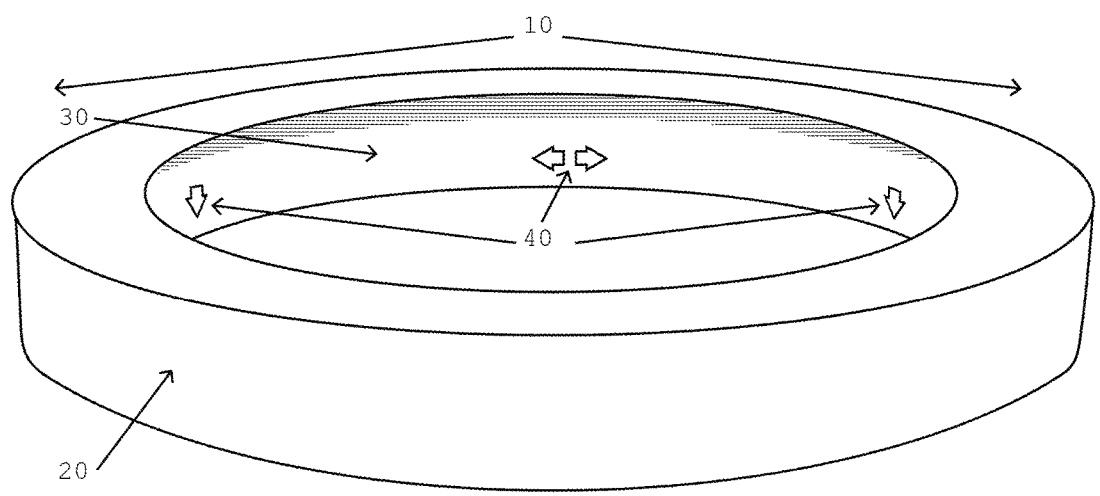
FIG. 1 is a top perspective view of an embodiment of the In-Ground Garden-Plant Watering-Well with Removable Twist-Ring showing its twist-ring detached from its watering-well.
Figure 1:
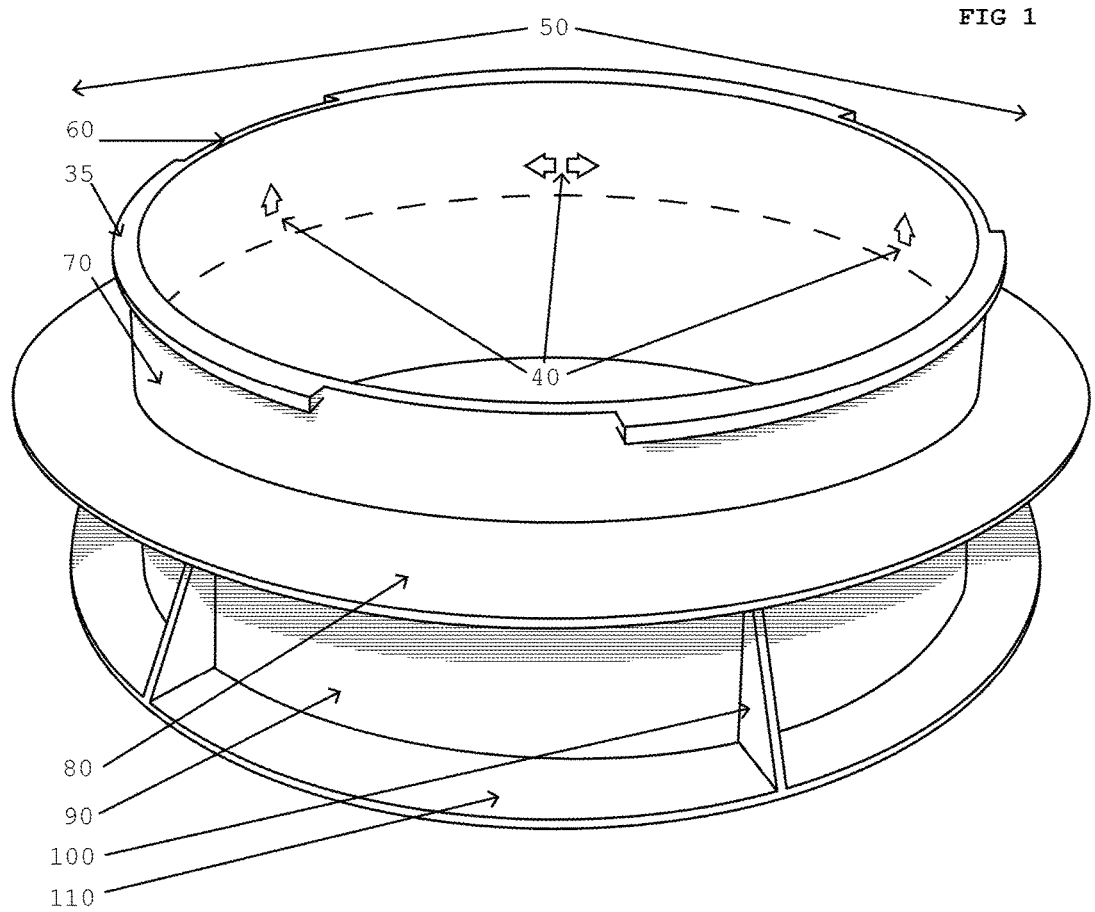

10 Twist-Ring
20 Outer-wall
30 Inner-toothed flange
35 Teeth
40 Alignment-tick
50 Watering-Well
60 Lip-toothed flange
70 Bowl
80 Twist-ring floor
90 Barrel
100 Lateral fin
110 Perpendicular flange
Twist-Ring Modifiers
120 Standard quick-connector
130 Drip-tube
140 Solar-powered light
150 Access-panel
160 Gnome twist-ring For purposes of clarity and brevity, like elements and components will bear the same designations and numbering throughout the figures.

DETAILED DESCRIPTION OF THE PRESENT EMBODIMENT

Before this first embodiment of a Bottomless In-Ground Garden-Plant Watering-Well with Removable Twist-Ring, along with its methods are disclosed and described, it is to be understood that this present embodiment is not limited to the particular configurations, sizes, or materials disclosed herein as such configurations, sizes, and materials may vary somewhat. Nor are any concept illustrations or diagrams to be construed as limiting. It is also to be understood that the terminology employed is used for describing this particular embodiment. And is not intended to be limiting; however, for brevity's sake throughout the description, the Bottomless In-Ground Garden-Plant Watering-Well with Removable Twist-Ring will be referenced by its two basic parts: twist-ring and watering-well; or as twist-ring watering-well.

FIG. 1 is a top perspective view of a twist-ring 10 detached from a watering-well 50 in accordance with the present embodiment. Twist-ring watering-wells may be fabricated from plastics, clays, ceramics, metals or any other suitable materials. This present embodiment has, for example, an environmentally friendly polypropylene (PP) plastic as its construction material; and is made up of two separate pieces, one is the twist-ring 10, and the other is the plant-container, or watering-well 50. Both pieces are each built of a single unified construction which will be apparent to those skilled in the art of plastic fabrication. In this embodiment the twist-ring outer-wall 20 is circular, but in alternate embodiments, it can be shaped as a rectangle, square, or any other geometrical shape or any organic shape or configuration deemed to be aesthetically pleasing or advantageous.

This embodiment of a twist-ring watering-well has its above ground portion that makes up a watering-well'S bowl 70 with an appropriate height to ensure suitable water volume, and it doubles as a plant-guard with or without its twist-ring 10 for ease of trimmer use during routine lawn maintenance.

The twist-ring 10 in this embodiment has an outer wall 20 and an inner-toothed flange 30 that is thicker for added strength as it has evenly spaced teeth 35. The circumference of the top opening of the twist-ring 10 is smaller than its bottom circumference so that it aligns up with, and rests on, the inner circumference of the lip-toothed flange 60 of the watering well giving the twist-ring 10 added support. The circumference of the twist-ring's outer-wall 20 aligns with, and rests on, the outer circumference of the twist-ring floor 80; the twist-ring inner-toothed flange 30 of the twist-ring 10 also rests on the twist-ring floor 80. The twist-ring 10 is attached or detached by aligning the teeth 35 of the inner-toothed flange 30 with the gaps in the lip-toothed flange 60 of the watering-well and twisting either to the left or the right. The twist-ring 10 is one of several support mechanisms for keeping the watering-well bowl's 70 top-edge above ground level.

The watering-well has both an aboveground portion and a belowground portion. The aboveground portion is the watering-well's bowl 70 and replaces its organic counterpart, the soil watering-well. The lip-toothed flange 60 is attached to the top edge of the bowl 70. To keep the watering-well's bowl 70 at its appropriate height above ground-level is another support mechanism; the twist-ring floor 80. It is attached to the outside base of the watering-well's bowl 70 where it meets the soil of the well's barrel 90, and the twist-ring floor 80 rests on the surface of the ground. The twist-ring floor 80 also works as a guide for proper depth placement of the watering-well. The belowground portion is the well's barrel 90, and in this embodiment, it has a suitable depth for plant and root growth and for hindering many types grass rhizomes. Attached to the outside wall of the well's barrel 90 just below the twist-ring floor 80 are evenly spaced lateral fins 100 rotational movement and loosening of the soil from repeated attaching and detaching of the twist-ring 10. Attached to the outer circumference of the well's barrel 90 at its base and the lateral fins, 100 is the perpendicular flange 110. This flange helps prevent upward movement of the well's barrel 90 from repeated attaching and detaching of the twist-ring 10. The perpendicular flange 110 is also, another mechanism for preventing the watering-well's bowl 70 from sinking to, or below, ground level.

Figure 2A:
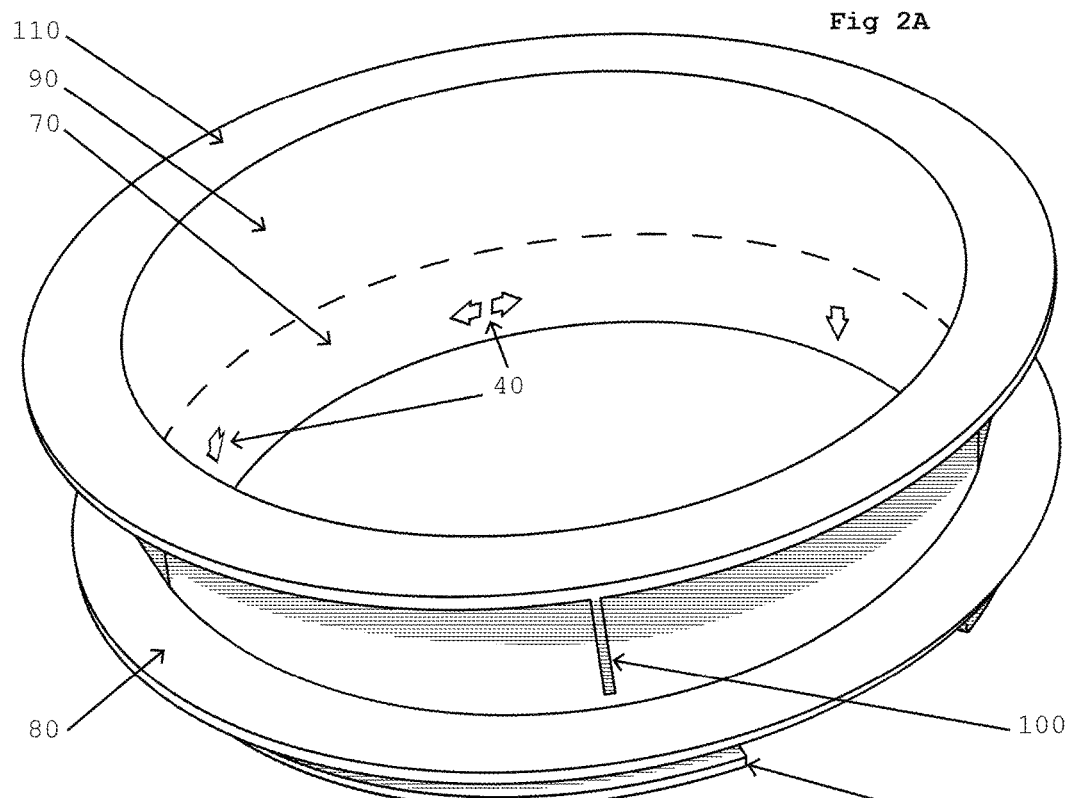
FIGS. 2A to 2B shows a bottom perspective view of the watering-well and a bottom perspective view of the twist-ring and the watering-well.
Figure 2B:
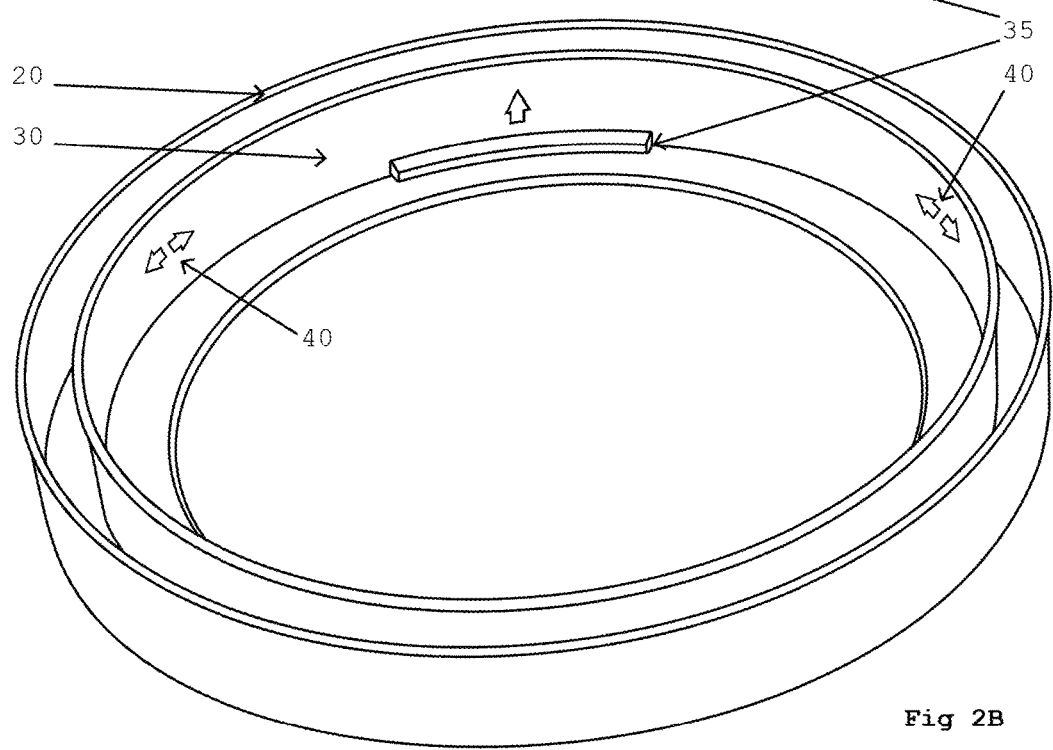

FIGS. 2A to 2B shows a bottom perspective view of the watering-well and its various components, and a bottom perspective view of the twist-ring with its various components.

Figure 3:
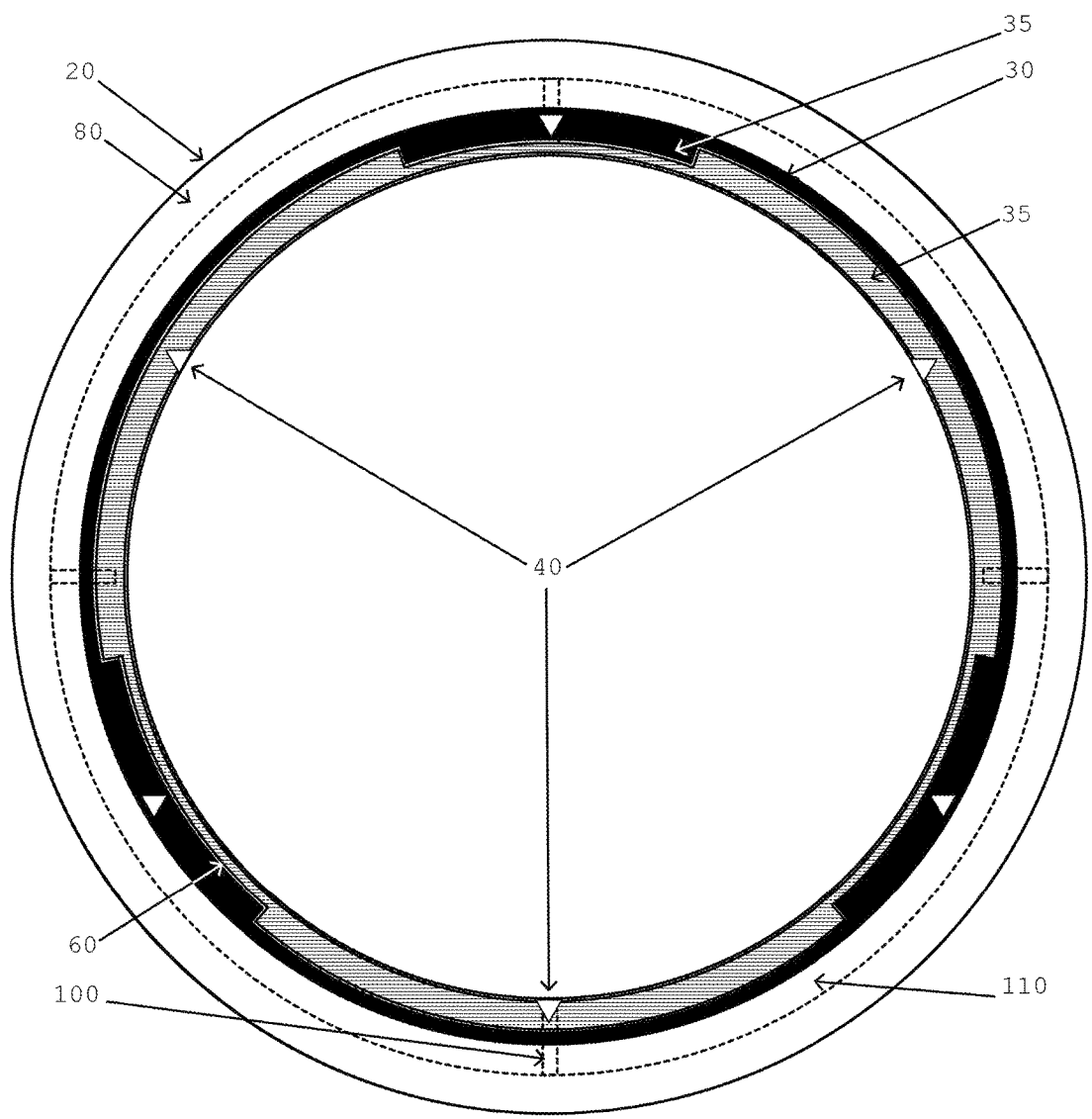
FIG. 3 is a detail view showing the twist-ring with its inner-toothed flange attached and aligned with a lip-toothed flange of a watering-well bowl and their alignment ticks in the unlocked position.

FIG. 3 is a detail view of a twist-ring 10 with the teeth 35 of its inner-toothed flange 30 centered under the lip-toothed flange 60 of the watering-well bowl 70 for a secure attachment.

Figure 4:
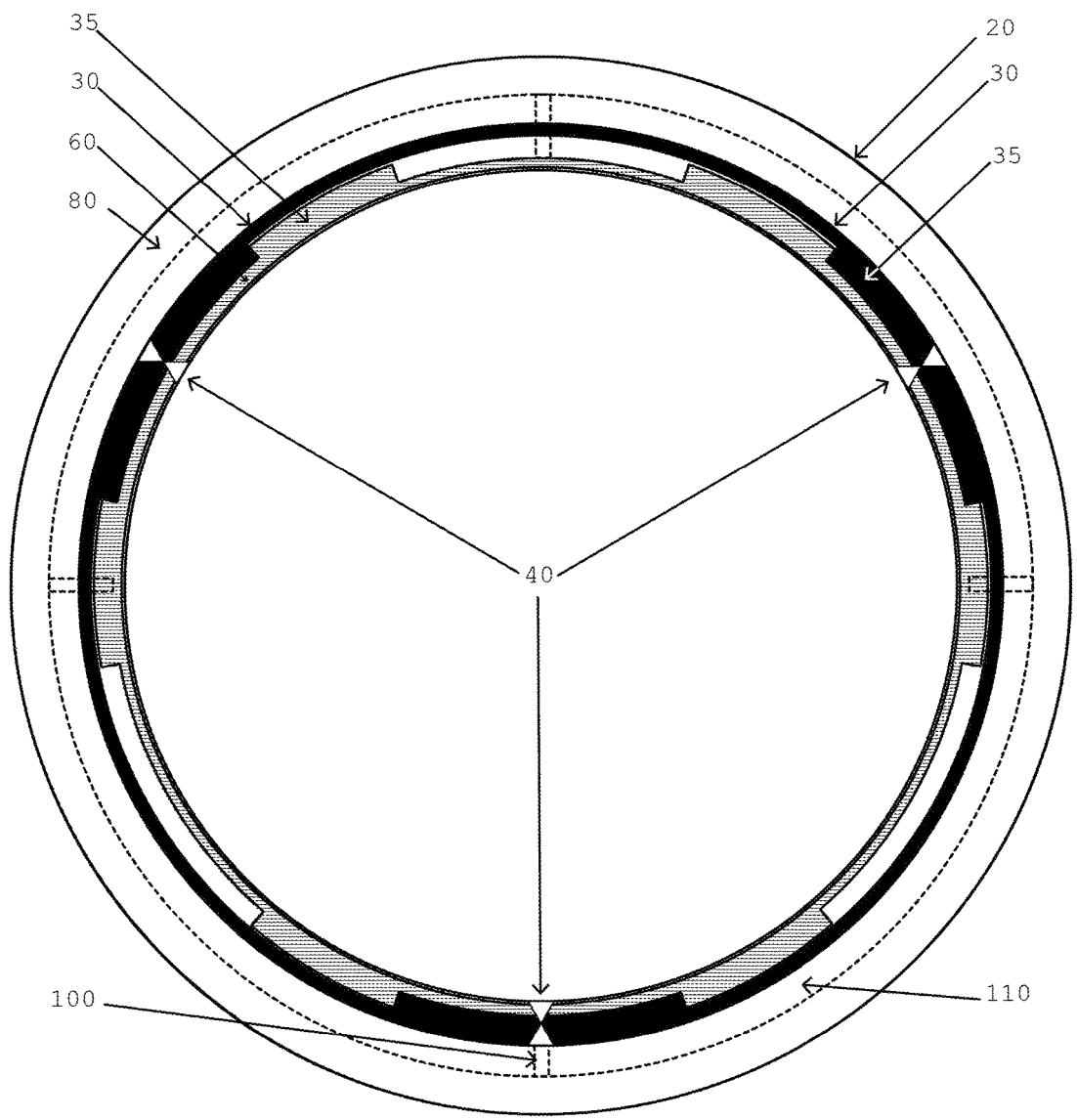
FIG. 4 is a detail view showing the twist-ring with its inner-toothed flange attached and aligned with the lip-toothed flange of the watering-well, and their alignment-ticks are in the locked position.

FIG. 4 is a detail view showing the twist-ring 10 with its inner-toothed flange 30 attached and aligned with the lip-toothed flange 60 of a watering-well bowl and both of their alignment ticks 40 are in the unlocked position.

FIGS. 5A to 5B shows side views of a watering-well 50 with its twist-ring 10 detached from its bowl 70, and a watering-well 50 with its twist-ring 10 attached to its bowl 70.

FIGS. 6A to 6E shows a collective view of various aspects of In-Ground Garden-Plant Watering-Wells with Twist-Rings. These conceptual aspects are not to be considered limiting, as watering-wells with twist-rings can be configured in unlimited ways, nor do they constitute a departure from the true spirit and scope of this invention.

6A is a bottom view of an aspect of a watering-well 50 with a drip-tube 130 attached to the inner wall of a column's base 170 mounted on top of a twist-ring 10, and the drip-tube 130 has a standard quick-connect valve 120 attached to it for watering.

6B shows a side view of an embodiment of a watering-well 50 with a lattice-column twist-ring 10 with a quick-connect valve 120, a solar-powered light 140 attached to the column's capital, and the lattice-column twist-ring 10 attached to its bowl 70.

6C shows an embodiment of a watering-well 50 with a gnome embellished twist-ring 10.

6D shows a back view embodiment of a watering-well 50 with lattice-column twist-ring 10 with a Corinthian-style capital and an access panel 150 and a standard quick-connect valve 120.

6E shows a view of the watering-well 50 with lattice-column twist-ring 10 with Corinthian-style capital detached from its bowl 70.

FIG. 7. (canceled)

Since other modifications and changes varied to fit particular operating requirements and environments will be apparent to those skilled in the art, this present embodiment is not considered limited to the examples chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A bottomless in-ground garden-plant watering-well comprising:
    a bowl with a first lip-attach flange and a second lip-attach flange circumferentially extending from a top of said bowl; and said lip-attach flanges couple said bowl to a removable twist-ring; and said bowl allows for an operable temporary well for water and liquids;
    a twist-ring floor circumferentially extending from an exterior surface of said bowl; and said twist-ring floor operates as a support for said removable twist-ring when coupled to said bowl;
    a barrel extending from a bottom edge of said bowl; and said barrel allows for a downward flow of water and liquids when said watering-well is in an installed position;
    a flange circumferentially extending from a bottom edge of said barrel; said flange extending substantially perpendicularly to an exterior surface of said barrel;
    a lateral fin rigidly connected to said exterior surface of said barrel; and said lateral fin is configured to minimises rotation of said barrel and of said bowl during coupling and uncoupling of said removable twist-ring when said watering-well is in an installed position;
    said removable twist-ring comprising:
    an outer-wall;
    and a twist-attach flange circumferentially extending from an underside of said outer-wall for engaging said lip-attach flanges of said bowl.

2. The bottomless in-ground garden-plant watering-well as recited in claim 1, further comprising:
    an alignment-tick, whereby said alignment-tick is configured to aid in aligning said twist-attach flange to a gap between said lip-attach flanges.

* * * * *